United States Patent Office 3,296,190
Patented Jan. 3, 1967

3,296,190
STABILIZATION OF POLYESTERS WITH A COMBINATION OF CARBODIIMIDES AND ORGANOSILICON COMPOUNDS
Artur Reischl, Leverkusen, Hans Holtschmidt, Cologne-Stammheim, Wolfram Neumann, Leverkusen, and Walter Simmler, Cologne-Mulheim, Germany, assignors to Farbenfabriken Bayer Aktiengesellschaft, Leverkusen, Germany, a German corporation
No Drawing. Filed Apr. 2, 1962, Ser. No. 184,541
Claims priority, application Germany, Apr. 25, 1961,
F 33,746
14 Claims. (Cl. 260—45.9)

This invention relates to stabilizers to prevent the hydrolysis of esters and, more particularly, to a method for stabilizing polyesters against hydrolysis and a novel composition of matter suitable for stabilizing the polyesters.

Although polyesters exhibit suitable physical properties for many applications, it is well-known that the ester groups in the molecule are subject to being hydrolyzed by moisture over a period of time and the rate of the hydrolysis is proportional to the number of ester groups present in the molecule.

Polyesters have found extensive use as a reactive component in the preparation of polyurethane plastics, however, because of this disadvantage in many applications it has become necessary to utilize polyethers, especially where contact with moisture is anticipated. It has been heretofore known to utilize certain organosilicon compounds as stabilizing agents for polyesters to prevent the hydrolysis of the ester groups. It has also been heretofore known to utilize compounds containing carbodiimide groups to accomplish this same purpose. The disadvantage of both of these types of stabilizers is that the stabilizing action cannot be extended beyond a maximum of time by increasing the quantity of the particular stabilizing agent used. That is, if a silicon compound or a carbodiimide group containing compound is utilized, upon conducting an aging test of the polyester, a maximum length of time before the sample is useless will be reached and the addition of a higher percentage of the stabilizing compound will not extend this time.

It is, therefore, an object of this invention to provide polyesters stabilized against hydrolysis and aging. It is another object of this invention to provide polyesters which are stable against hydrolysis even at high temperatures. It is still another object of this invention to provide a new stabilizing agent for polyesters. It is a further object of this invention to provide a method of stabilizing polyesters against hydrolysis and aging.

The foregoing objects and others which will become apparent from the following description are accomplished in accordance with this invention, generally speaking, by providing polyesters stabilized against hydrolysis and aging by incorporating therein an organosilicon compound having at least one group containing hydrogen atoms reactive with —NCO groups and determinable by the Zerewitinoff method, the group containing the reactive hydrogen being bonded to a carbon atom which is in turn bonded directly to a silicon atom and an organic compound containing at least one carbodiimide group. Thus, the invention contemplates the incorporation of the compounds stated above to polyesters in order to extend the stabilizing action against hydrolysis. It has been found that although an increase in the quantity of either one of the stabilizing agents when used alone will not extend the life time of the polyester, the mixture of the two produces a synergistic effect greatly improving the resistance of the polyesters against hydrolysis and aging.

In accordance with this invention, any suitable organosilicon compound containing at least one group having hydrogen atoms reactive with an —NCO group and determinable by the Zerewitinoff method where the group containing the hydrogen atom is bonded to a carbon atom which is in turn bonded directly to a silicon atom may be used. The organosilicon compound can be represented by the formula

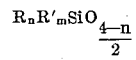

in which R represents a member consisting of hydrocarbon radicals free of aliphatic unsaturation of the group consisting of alkyl and aryl radicals and —X—Y groups; R' represents a divalent —X— radical linking together one Si-atom and one O-atom; at least some of said R's being hydrocarbon radicals and in case of $m=0$ at least one of said R's being an —X—Y— group; X being selected from the group consisting of alkylene and nitrogen-interrupted alkylene; Y being selected from the group consisting of —OH, —COOH, —NH$_2$, —NH(XOH), —N(XOH)$_2$, —(OX')$_q$OH

and

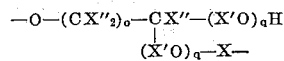

X' being an alkylene radical; X" being selected from the group consisting of hydrogen, alkyl and aryl radicals; $n$ having a value from 2 to 3; $m$ and $o$ being integers from 1–30 including zero; $q$ being an integer from 1 to 300.

In other words, the organosilicon compound contains the grouping

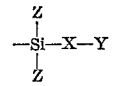

at least once or an organosilicon compound containing the grouping

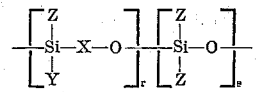

in which Z represents an alkyl, aryl, siloxy or siloxanyl radical; X represents alkylene or nitrogen-interrupted alkylene, otherwise expressed alkylene-[NX"-alkylene]$_p$; X" and Y have the above meaning; $r$ and $p$ represent whole numbers up to 30, $s$ is a whole number up to 300, and in which the sum of $r$ and $s$ is at least 2.

The common features of the organosilicon compounds contemplated by this invention is the groups containing the reactive hydrogen linked to a silicon atom through an alkylene radical. In the second grouping shown above the reactive hydrogen atom does not have to be present at the time the organosilicon compound is added to the reaction mixture. The letter X in the second grouping above represents an alkylene radical. When a compound containing this grouping is contacted by water, the Si—X—O bridges are split when a reaction is conducted with a diisocyanate to form a grouping containing active hydrogen atoms. Thus, compounds containing this grouping can either be contacted with water and a diisocyanate before admixing with the polyester to be stabilized or they may first be admixed with the polyester and then contacted with water and a diisocyanate to cause the splitting of the Si—X—O bridges and thereby form a group containing reactive hydrogen. Splitting of this bridge is also effected by the presence of hydroxyl groups, carboxyl groups or ester groups in the mixture. Thus, it is not essential that a diisocyanate be used. However, when a polyurethane is being formed utilizing the polyesters stabilized by the method of this invention, this is one way of providing the necessary reactive hydrogen on the silicon compound.

Any organosilicon compound containing reactive hydrogen bonded through an alkylene group to a silicon atom can be used in accordance with this invention. Typical compounds of this type and others suitable for the purposes of this invention include $$HOH_2C-\underset{\underset{CH_3}{|}}{\overset{\overset{CH_3}{|}}{Si}}-O-\underset{\underset{CH_3}{|}}{\overset{\overset{CH_3}{|}}{Si}}-O-\underset{\underset{CH_3}{|}}{\overset{\overset{CH_3}{|}}{Si}}-CH_2OH$$

$$HOH_2C-\underset{\underset{C_2H_5}{|}}{\overset{\overset{C_2H_5}{|}}{Si}}-O-\underset{\underset{C_2H_5}{|}}{\overset{\overset{C_2H_5}{|}}{Si}}-O-\underset{\underset{C_2H_5}{|}}{\overset{\overset{C_2H_5}{|}}{Si}}-CH_2OH$$

$$HOH_2C-\underset{\underset{CH_3}{|}}{\overset{\overset{CH_3}{|}}{Si}}-\left[-O-\underset{\underset{CH_3}{|}}{\overset{\overset{CH_3}{|}}{Si}}-\right]_n O-\underset{\underset{CH_3}{|}}{\overset{\overset{CH_3}{|}}{Si}}-CH_2OH$$

wherein $n=0$ to 100 or more.

$$\begin{array}{c}HOH_2C-H_2C\\HOH_2C-H_2C\end{array}\!\!N-CH_2-\underset{\underset{CH_3}{|}}{\overset{\overset{CH_3}{|}}{Si}}-O-\underset{\underset{CH_3}{|}}{\overset{\overset{CH_3}{|}}{Si}}-CH_2-N\!\!\begin{array}{c}CH_2-CH_2-OH\\CH_2-CH_2-OH\end{array}$$

$$NH_2-CH_2-\underset{\underset{CH_3}{|}}{\overset{\overset{CH_3}{|}}{Si}}-O-\underset{\underset{CH_3}{|}}{\overset{\overset{CH_3}{|}}{Si}}-CH_2-NH_2$$

$$HOH_2C-H_2CHN-CH_2-\underset{\underset{CH_3}{|}}{\overset{\overset{CH_3}{|}}{Si}}-O-\underset{\underset{CH_3}{|}}{\overset{\overset{CH_3}{|}}{Si}}-CH_2-NHCH_2-CH_2-OH$$

$$H_2NH_2C-\underset{\underset{CH_3}{|}}{\overset{\overset{CH_3}{|}}{Si}}-\left[-O-\underset{\underset{CH_3}{|}}{\overset{\overset{CH_3}{|}}{Si}}-\right]_n O-\underset{\underset{CH_3}{|}}{\overset{\overset{CH_3}{|}}{Si}}-CH_2NH_2$$

wherein $n=0$ to 100 or more.

$$HOOC-\underset{\underset{CH_3}{|}}{\overset{\overset{CH_3}{|}}{Si}}-\left[-O-\underset{\underset{CH_3}{|}}{\overset{\overset{CH_3}{|}}{Si}}-\right]_n O-\underset{\underset{CH_3}{|}}{\overset{\overset{CH_3}{|}}{Si}}-COOH$$

wherein $n=0$ to 100 or more.

$$HO-\underset{R}{\overset{}{C}}H-CH_2-\underset{R}{\overset{}{C}}H-O-CH_2-\underset{\underset{CH_3}{|}}{\overset{\overset{CH_3}{|}}{Si}}-O-\left[\underset{\underset{CH_3}{|}}{\overset{\overset{CH_3}{|}}{Si}}-O-\right]_n \underset{\underset{CH_3}{|}}{\overset{\overset{CH_3}{|}}{Si}}-CH_2-O-\underset{R}{\overset{}{C}}H-CH_2-\underset{R}{\overset{}{C}}H-OH$$

wherein $n=0$ to 100 or more and R=hydrogen and methyl (1:1);

$$HO-(CH_2)_3-O-(CH_2)_3-O-CH_2-\underset{\underset{CH_3}{|}}{\overset{\overset{CH_3}{|}}{Si}}-O-\left[\underset{\underset{CH_3}{|}}{\overset{\overset{CH_3}{|}}{Si}}-O-\right]_n \underset{\underset{CH_3}{|}}{\overset{\overset{CH_3}{|}}{Si}}-CH_2-O-(CH_2)_3-O-(CH_2)_3-OH$$

wherein $n=0$ to 100 or more;

$$CH_3-CH_2-\underset{\underset{CH_2-OH}{|}}{\overset{\overset{CH_2-OH}{|}}{C}}-O-CH_2-\underset{\underset{CH_3}{|}}{\overset{\overset{CH_3}{|}}{Si}}-O-\left[\underset{\underset{CH_3}{|}}{\overset{\overset{CH_3}{|}}{Si}}-O-\right]_n \underset{\underset{CH_3}{|}}{\overset{\overset{CH_3}{|}}{Si}}-CH_2-O-CH_2-\underset{\underset{CH_2-OH}{|}}{\overset{\overset{CH_2-OH}{|}}{C}}-CH_2-CH_3$$

wherein $n=0$ to 100 or more;

$$\left[H-\left\{O-CH_2-\underset{\underset{CH_2-OH}{|}}{\overset{\overset{CH_2}{|}\atop CH_3}{C}}-CH_2-O-CH_2-\underset{\underset{CH_3}{|}}{\overset{\overset{CH_3}{|}}{Si}}-O-\left(\underset{\underset{CH_3}{|}}{\overset{\overset{CH_3}{|}}{Si}}-O-\right)_n \underset{\underset{CH_3}{|}}{\overset{\overset{CH_3}{|}}{Si}}-CH_2-\right\}-OH(Br)\right]_x$$

wherein $n=0$ to 100 or more and $x=1$ to 100 and more;

$$HOCH_2-\underset{\underset{CH_3}{|}}{\overset{\overset{CH_3}{|}}{Si}}-\left[-O-\underset{\underset{CH_3}{|}}{\overset{\overset{CH_3}{|}}{Si}}-\right]_n O-\underset{\underset{CH_3}{|}}{\overset{\overset{CH_3}{|}}{Si}}-CH_3$$

wherein $n=0$ to 100 or more.

$$H_2NCH_2-\underset{\underset{CH_3}{|}}{\overset{\overset{CH_3}{|}}{Si}}-\left[-O-\underset{\underset{CH_3}{|}}{\overset{\overset{CH_3}{|}}{Si}}-\right]_n O-\underset{\underset{CH_3}{|}}{\overset{\overset{CH_3}{|}}{Si}}-CH_3$$

wherein $n=0$ to 100 or more.

$$H_2N\underset{\underset{H}{|}}{\overset{\overset{H}{|}}{C}}-\underset{\underset{CH_3}{|}}{\overset{\overset{CH_3}{|}}{Si}}-O-\underset{\underset{CH_3}{|}}{\overset{\overset{CH_3}{|}}{Si}}-O-\underset{\underset{CH_3}{|}}{\overset{\overset{CH_3}{|}}{Si}}-CH_3$$

$$\begin{array}{c}HO(CH_2)_4\\HO(CH_2)_4\end{array}\!\!N-CH_2-\underset{\underset{CH_3}{|}}{\overset{\overset{CH_3}{|}}{Si}}-O-\underset{\underset{CH_3}{|}}{\overset{\overset{CH_3}{|}}{Si}}-CH_2-N\!\!\begin{array}{c}(CH_2)_4OH\\(CH_2)_4OH\end{array}$$

Examples of compounds suitable for this invention and having an alkylene radical bonded to a silicon atom which forms a grouping containing reactive hydrogen upon the splitting of an Si—X—O bridge include all compounds containing the following grouping:

$$-\left[\underset{\underset{CH_3}{|}}{\overset{\overset{CH_3}{|}}{Si}}-X-O-\right]_r \left[\underset{\underset{CH_3}{|}}{\overset{\overset{CH_3}{|}}{Si}}-O-\right]_s-$$

wherein the ratio of $r$ to $s$ is 2 to 10.

Specific compounds of this type include:

$$CH_3-\left[\underset{\underset{CH_3}{|}}{\overset{\overset{CH_3}{|}}{Si}}-CH_2-O-\right]_2 \left[\underset{\underset{CH_3}{|}}{\overset{\overset{CH_3}{|}}{Si}}-O-\right]_{10}-Si(CH_3)_3$$

$$CH_3-\left[\underset{\underset{CH_3}{|}}{\overset{\overset{CH_3}{|}}{Si}}-CH_2-CH_2-O-\right]_4 \left[\underset{\underset{CH_3}{|}}{\overset{\overset{CH_3}{|}}{Si}}-O-\right]_{20}-Si(CH_3)_3$$

In accordance with this invention, any suitable organic compound containing at least one carbodiimide group may be used in admixture with an organosilicon compound to extend the life time of polyesters by decreasing the hydrolysis thereof such as, for example, diisopropyl carbodiimide, dicyclohexyl carbodiimide, methyl tertiary butyl carbodiimide, tertiary butyl phenyl carbodiimide, tetramethylene-bis-diisobutyl carbodiimide, N-dimethyl amino propyl tertiary butyl carbodiimide, the monoglycol ether of hydroxyphenyl-tertiary butyl carbodiimides; poly-carbodiimides having a molecular weight of at least about 500 and having more than 3 carbodiimide groups in the molecule and prepared by reacting polyisocyanate in the presence of catalysts; aromatic and cycloaliphatic mono-carbodiimides substituted in at least the 2 and 2' positions with an alkyl group having from 1 to 18 carbon atoms such as, for example, methyl, ethyl, propyl, isopropyl, butyl, isobutyl, dodecyl, octadecyl, aryl, crotyl, oleyl and the like; aralkyl groups such as for example, benzyl-β-phenyl ethyl, xylyl and the like; aryl groups such as, for example, phenyl, tolyl, naphthyl, and the like; alkoxy groups with alkyl residues having from 1 to 18 carbon atoms such as, methoxy, ethoxy, butoxy and the like; halogen atoms such as chlorine, bromine, fluorine, iodine and the like; nitro groups, carbalkoxy groups such as, carbomethoxy groups, ethoxy and the like and cyano groups. These compounds can be prepared by any of the methods described in U.S. patent applications Serial Nos. 162,589, now Patent No. 3,193,523 and 110,651. Organic compounds containing carbodiimide groups can be prepared from organic isocyanates by heating in the presence of a suitable catalyst. Such methods for preparing carbodiimides are described in U.S. Patents 2,840,589; 2,853,473; 2,853,518; 2,941,966; and 2,941,983.

Any suitable isocyanate can be used to prepare carbodiimide containing compounds in accordance with this invention such as, for example, phenyl isocyanate, tolyl isocyanate, isobutyl isocyanate, isopropyl isocyanate, benzyl isocyanate, toluylene diisocyanate, 4,4'-diphenyl methane diisocyanate, m-phenylene diisocyanate, 1,5-naphthylene diisocyanate, 4-chloro-1,3-phenylene diisocyanate, tetramethylene diisocyanate, hexamethylene diisocyanate, 1,4-dicyclohexyl diisocyanate, 1,4-cyclohexyl diisocyanate, 2,4,6-toluylene triisocyanate and the like. Further, carbodiimides prepared by treating di-substituted thioureas with metal oxides may be used in the practice of this invention. Any of the polycarbodiimides described in U.S. patent applications Serial Nos. 43,987, now Patent No. 3,152,162; 618,458, now abandoned; 110,651; 155,791, now Patent No. 3,193,522 and 162,589, now Patent No. 3,193,523 may be used to stabilize polyesters in conjunction with the organosilicon compounds described above. It is pointed out that the carbodiimide group is the essential part of the molecule which produces the stabilizing effect and that the structure of the remainder of the molecule is secondary as any organic compound which contains a carbodiimide group will operate to stabilize polyesters in accordance with this invention. It is preferred to use carbodiimides which exert a low vapour pressure that is carbodiimides with a molecular weight of more than 250.

Specific examples of carbodiimide containing compounds include 2,2'-dimethyl-diphenyl carbodiimide, 2,2'-diisopropyl-diphenyl carbodiimide, 2-dodecyl-2'-n-propyl-diphenyl carbodiimide, 2,2' - diethoxy-diphenyl carbodiimide, 2 - O - dodecyl - 2' - O - ethyl - diphenyl carbodiimide, 2,2'-dichloro-diphenyl carbodiimide, 2,2'-ditolyl-diphenyl carbodiimide, 2,2'-dibenzyl-diphenyl carbodiimide, 2,2' - dinitro-diphenyl carbodiimide, 2-ethyl-2'-isopropyl-diphenyl carbodiimide, 2,6,2', 6'-tetraethyl-diphenyl carbodiimide, 2,6,2',6' - tetrasecondary - butyl-diphenyl carbodiimide, 2,6,2',6'-tetraethyl-3,3'-dichloro-diphenyl carbodiimide, 2,6,2',6'-tetraisopropyl - 3,3' - dinitro-diphenyl carbodiimide, 2 - ethyl-cyclohexyl - 2 - isopropyl-phenyl carbodiimide, 2,4,6,2',4',6'-hexaisopropyl-diphenyl carbodiimide, 2,2'-diethyl-dicyclohexyl carbodiimide, 2,6,2',6'-tetraisopropyl-dicyclohexyl carbodiimide, 2,6,2',6'-tetraisopropyl dicyclohexyl carbodiimide, 2,6,2', 6'-tetraethyl - dicyclohexyl carbodiimide and 2,2'-dichlorodicyclohexyl carbodiimide, 2,2'-dicarbethoxy diphenyl carbodiimide, 2,2'-dicyano-diphenyl carbodiimide and the like.

The mixture of the organosilicon compound and the organic compound containing carbodiimide groups can be used in an amount of from about 0.1 to about 10% by weight based on the weight of the polyester. It is preferred, however, to use from about 0.1 to about 3% by weight. The mixture of the organosilicon compound and the compound containing carbodiimide groups can be prepared by utilizing the organosilicon compound and the carbodiimide compound in a ratio by weight of from about 1:0,1 to about 1:10.

Any composition containing ester linkages

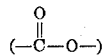

may be stabilized against hydraulic degration by the introduction of the stabilizing compounds in accordance with this invention such as, for example, the reaction product of a carboxylic acid with an alcohol. Any suitable carboxylic acid may be used in the preparation of compositions containing ester groups in accordance with this invention such as, for example, acetic acid, phenyl acetic acid, benzoyl acetic acid, pyruvic acid, propionyl acetic acid, butyryl formic acid, aceto butyric acid, levulinic acid, 1,2-keto stearic acid, 1,3-keto behenic acid, aldo-valeric acid, hexahydrobenzoic acid, 1,2-cyclohexanone carboxylic acid, brassylic acid, phenyl malonic acid, ethyl glycollic acid, thiodiglycollic acid, β-chloropropionic acid, glutaconic acid, ethoxymalonic acid, malic acid, aspartic acid, acrylic acid, methacrylic acid, cinnamic acid, benzene tricarboxylic acid, adipic acid, succinic acid, suberic acid, sebacic acid, oxalic acid, methyladipic acid, glutaric acid, pimelic acid, azelaic acid, phthalic acid, terephthalic acid, isophthalic acid, thiodipropionic acid, maleic acid, fumaric acid, citraconic acid, itaconic acid and the like.

Any suitable alcohol may be used such as, for example, methyl alcohol, ethyl alcohol, propyl alcohol, isopropyl alcohol, n-butyl alcohol, isobutyl alcohol, secondary butyl alcohol, tertiary butyl alcohol, amyl alcohol, hexyl alcohol, octyl alcohol, decyl alcohol, lauryl alcohol, myristyl alcohol, cetyl alcohol, stearyl alcohol, allyl alcohol, methallyl alcohol, crotyl alcohol, 2-propyl-1-ol, oleyl, alcohol, geraniol, citronellol, linalool, diacetone alcohol, ethylene glycol monoethyl ether, cyclohexanol, naphthenic alcohols, benzyl alcohol, tolyl alcohol, phenyl ethyl alcohol, octadecylbenzyl alcohol, ethylene glycol, propylene glycol, 1,4-butanediol, 1,3-butanediol, 1,5-pentanediol, 1,6-hexanediol, bis-(hydroxy methyl chloro hexane), diethylene glycol, 2,2-dimethyl propylene glycol, 1,3,6- hexane triol, trimethylol propane, pentaerythritol, sorbitol, glycerine and the like. The method of stabilizing compositions containing ester groups is applicable not only to monoesters but also to polyesters in accordance with the compounds listed above having a functionality greater than 1. For example, where any of the di- or polycarboxylic acids are reacted with the di- or polyhydric alcohols, a polyester having more than 1 ester group, of course, will result. The stabilization of the composition containing ester groups against hydrolysis increases as the number of ester groups in the molecule increases.

Of course, other compositions containing polyester resins as a reaction component or in admixture can also be stabilized by the process of this invention. For example, compositions such as polyester amides and polyester urethanes can be stabilized. The reaction product of any of the carboxylic terminated or hydroxyl terminated esters set forth above can be reacted with a suitable isocyanate to prepare a polyurethane. In the preparation of polyesteramides, the reaction of a carboxylic acid, an alcohol and an amine can be carried out simultaneously or in steps in the manner set forth for the preparation of polyurethanes. Of course, aminoalcohols and aminoacids can be used in the preparation of polyesteramides. The pertinent feature is, however, that any composition containing ester groups can be stabilized against hydrolysis by the introduction thereto of a carbodiimide containing compound and an organosilicon compound as described above.

Any suitable polyisocyanate can be used in the preparation of polyester urethane by reaction with a polyester such as, any of those set forth below for use in preparing the polycarbodiimides.

Any suitable amino compound can be used to prepare polyesteramides such as, for example, hexamethylene diamine, ethylene diamine, propylene diamine, butylene diamine, cyclohexyl diamine, phenylene diamine, tolylene diamine, xylylene diamine, 4,4'-diamino,diphenylmethane, naphthylene diamine, aminoethyl alcohol, aminopropyl alcohol, aminobutyl alcohol, aminobenzyl alcohol, aminoacetic acid, aminopropionic acid, aminobutyric acid, aminovaleric acid, aminophthalic acid, aminobenzoic acid, and the like. Of course, the amino compounds may be reacted either simultaneously with the ester forming components or sequentially therewith.

Example 1

About 1.5 parts of the organosilicon Compound V of the formula

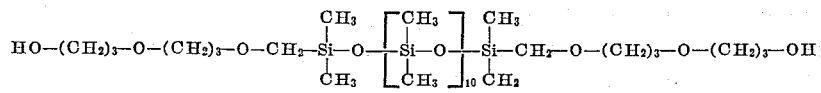

It is also within the scope of this invention that naturally occurring esters may be stabilized against hydrolysis and aging in accordance with this invention such as, for example, castor oil, cocoanut oil, corn oil, cottonseed oil, horse fat oil, lard oil, wool fat, japan wax, mutton tallow, beef tallow, neat's-foot oil, palm oil, peanut oil, carnauba wax, spermaceti, beeswax, rapeseed oil, soya bean oil, whale oil, sperm oil and the like. Further, any compositions containing ester groups as well as unsaturation may be stabilized in accordance with this invention. Such compositions may be formed by polymerization, condensation or a combination of both. Any of those unsaturated carboxylic acids mentioned above may be used in the preparation of such polyesters. Further examples of such compositions include polyester resins of polymerizable monomers such as styrene, and unsaturated polyesters, for example, those of fumaric or maleic acid as well as polyvinylesters such as polyvinylacetate and ethylene vinyl ester copolymers, acrylic and methacrylic acid ester polymers and their copolymers with vinyl esters, fluorinated acrylic esters and their copolymers, copolymers of acrylonitrile and acrylic acid esters such as methylacrylate and the like.

Of course, the stabilizing action in accordance with this invention will occur also in plastics containing ester groups. These plastics can be in the form of lacquers, foils, coatings, fibers, foam materials, elastomers, casting resins or molded elements.

The mixture of stabilizing agents can be incorporated into the polyester by stirring either before, during or after the formation of the polyester itself. For example, the stabilizing agents can be mixed with one of the components used in the preparation of the polyester, it can be mixed into the reactive mixture of the alcohol and the carboxylic acid during the reaction to form the ester itself or it can be admixed into the polyester after the formation thereof by being introduced into a storable intermediate stage in the manufacture of the plastic. The two stabilizing agents can be added simultaneously or separately in any desired sequence. One particular form is to prepare an organosilicon compound containing carbodiimide groups. Thus, a stabilizing agent is used in this case wherein the two jointly acting agents are contained in combined form in one compound. Such carbodiimide modified organosilicon compounds can be prepared by adding polyisocyanates containing carbodiimide groups to organosilicon compounds having alcoholic hydroxyl groups. Any of the carbodiimide groups containing isocyanates mentioned above can be reacted with the reactive hydrogen atoms present in the organosilicon compound to produce this type of stabilizing compound. Such isocyanate containing carbodiimides can, of course, be prepared by reacting polyisocyanates in the presence of catalysts and include such as, for example, di-(3-isocyanato-4-methylphenyl) carbodiimide and the like.

The invention is further illustrated by the following examples in which parts are by weight unless otherwise specified.

and about 100 parts of a polyester of ethylene glycol and adipic acid having an hydroxyl number of 56 and an acid number of about 1 are heated for dehydration purposes for about 30 minutes to from about 130 to about 140° at about 12 mm. Hg while stirring. About 30 parts of naphthylene-1,5-diisocyanate and thereafter about 2 parts of polymeric carbodiimide from 1,3,5-triisopropylbenzene-2,4-diisocyanate of melting point 115° C. (Compound I) are caused to act thereon at about 130° C. After a total of 12 to 15 minutes, 14 parts of butane-1,4-diol are incorporated by stirring at 125° C., the mixture is poured into molds heated to from about 100 to about 110° C., removed from the mold after about 15 minutes and finally heated or cured for another 24 hours at the same temperature.

Example 2

About 1.5 parts of the organosilicon Compound IV of the formula

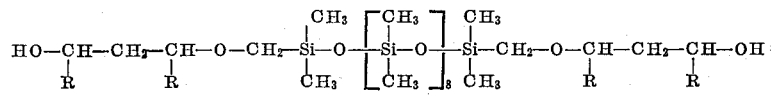

(R=H or CH₃, in the ratio 1:1) are processed as indicated in Example 1, but with the concurrent use of 1 part of 2,2',6,6'-tetraethyl diphenyl carbodiimide (Compound II).

Example 3

About 0.5 part of organosilicon Compound IV and 2 parts of carbodiimide II are used as described in Example 1 in the production of an elastomer.

Example 4

About 2 parts of octamethyl cyclotetrasiloxane (Compound VI) and about one part of 2,2',6,6'-tetraisopropyldiphenyl carbodiimide (Compound III) are used according to Example 1 in the production of an elastomer.

Example 5

About 1.5 parts of organosilicon Compound IV and 1 part of monocarbodiimide (Compound III) serve as a means for protection against aging with the elastomer produced according to Example 1.

Example 6

Preparation of adduct A:

About 26.5 parts of a carbodiimide with an isocyanate content of 14.8% (Compound Ia), prepared by heating triisopropyl benzene diisocyanate to about 150° C. in the presence of 25% alcoholic potassium hydroxide in accordance with U.S. application Serial No. 110,651 are heated with 100 parts of organosilicon Compound IV for about 30 minutes to about 130° C. while stirring. After cooling, the adduct is a brownish, highly viscous liquid.

After dehydration, about 100 parts of ethylene glycol adipic acid polyester are reacted with about 30 parts of naphthylene-1,5-diisocyanate at about 125° C. and then about 4 parts of adduct A are incorporated by stirring. After about 12 to about 15 minutes, about 14 parts of butane-1,4-diol are incorporated by stirring, the mixture is poured into molds at a temperature of about 100° C. and the final heating takes place for about 24 hours at this temperature.

Example 7

Preparation of adduct B:

About 35 parts of a carbodiimide with an isocyanate content of about 11% (Compound Ib), prepared according to Example 6 from triisopropyl benzene diisocyanate, are reacted with about 100 parts of the organosilicon Compound IV, as described in connection with the preparation of adduct A.

About 2 parts of the adduct B are used in the preparation of an elastomer according to Example 6, instead of the 4 parts of adduct A used in the said example.

The following table shows the physical properties of the products prepared in accordance with the foregoing Examples 1 to 7. Under the headline of comparison examples the next table shows the decrease of the physical properties in the course of the indicated days of materials which either contain only the carbodiimide stabilizer or only the organosilicon compound stabilizer. The elastomers of the comparison examples, i.e., examples A to M are made according to Example 1 with only the indicated amounts of either carbodiimide or organosilicon compound.

It is, of course, to be understood that any composition containing ester groups can be stabilized against hydrolysis and aging by utilizing the combination of components set forth above and that any polyester, organosilicon compound and organic compound containing carbodiimide groups can be used throughout the working examples in place of those specifically set forth therein. It is again pointed out that the carbodiimide group is the portion of the molecule of this stabilizing compound which contributes to the stabilization of the polyesters and that any compound containing such a group will be beneficial.

Although the invention has been described in considerable detail in the foregoing for the purpose of illustration, it is to be understood that variations can be made by those skilled in the art without departing from the spirit of the invention and scope of the claims.

What is claimed is:

1. A polyester stabilized against hydrolysis and aging by having incorporated therein a stabilizing amount of a carbodiimide and a stabilizing amount of a silicon compound having the general formula:

$$R_n R'_m SiO_{\frac{4-n}{2}}$$

in which R represents a member selected from the group consisting of —X—Y groups and hydrocarbon radicals free of aliphatic unsaturation, said hydrocarbon radicals being selected from the group consisting of alkyl and aryl radicals; R' represents a divalent —X— radical linking together one Si-atom and one O-atom; at least some of said R's being hydrocarbon radicals and in case of $m=0$ at least one of said R's being an —X—Y group; X is selected from the group consisting of alkylene and nitrogen-interrupted alkylene; Y is selected from the group consisting of —OH, —COOH, —NH$_2$ —NH(XOH)
—N(XOH)$_2$
—(OX')$_q$OH

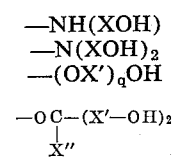

X' is an alkenyl radical; X" is selected from the group consisting of hydrogen, alkyl and aryl radicals; n has a value from 2 to 3; m and o are integers from 1–30 including zero and q is an integer from 1 to 300.

| Example | Carbodiimide[1] | Organosilicon compound[1] | Tensile strength, kg./cm.$^2$ | | | Breaking elongation, percent | | | Elongation, 1 min. after tearing, percent | | | Ring test strength, kg./abs. | | | Shore hardness, A | | |
|---|---|---|---|---|---|---|---|---|---|---|---|---|---|---|---|---|---|
| | | | 0 | 14 | 28 | 0 | 14 | 28 | 0 | 14 | 28 | 0 | 14 | 28 | 0 | 14 | 28 |
| 1 | 2 I | 1.5 V | 308 | 294 | 241 | 450 | 463 | 518 | 13 | 15 | 32 | 45 | 47 | 37 | 91 | 90 | 89 |
| 2 | 1 II | 1.5 IV | 276 | 209 | 196 | 383 | 445 | 527 | 7 | 20 | 44 | 29 | 29 | 28 | 90 | 89 | 90 |
| 3 | 2 II | 0.5 IV | 326 | 192 | 173 | 423 | 455 | 475 | 10 | 15 | 54 | 34 | 30 | 25 | 93 | 92 | 91 |
| 4 | 1 III | 2 VI | 293 | 250 | 193 | 375 | 540 | 502 | 8 | 46 | 55 | 25 | 32 | 27 | 88 | 90 | 90 |
| 5 | 1 III | 1.5 IV | 336 | 274 | 251 | 507 | 562 | 560 | 18 | 42 | 49 | 51 | 43 | 42 | 93 | 93 | 92 |
| 6 | Adduct A | 3.2 IV | 286 | 279 | 218 | 525 | 500 | 480 | 18 | 19 | 38 | 47 | 46 | 42 | 93 | 91 | 91 |
| 7 | 0.8 Ia Adduct B 0.5 Ib | 1.5 IV | 283 | 271 | 202 | 485 | 575 | 455 | 19 | 32 | 37 | 55 | 48 | 43 | 95 | 94 | 93 |

[1] Quantity by weight and compound.
The numbers 0, 14 and 28 designate the days of ageing at 70° C./95% air humidity.

COMPARISON EXAMPLES

| Example | Carbodiimide[1] | Organosilicon compound[1] | Tensile strength, kg./cm.$^2$ | | | Breaking elongation, percent | | | Elongation, 1 min. after tearing, percent | | | Ring test strength, kg./abs. | | | Shore hardness, A | | |
|---|---|---|---|---|---|---|---|---|---|---|---|---|---|---|---|---|---|
| | | | 0 | 14 | 28 | 0 | 14 | 28 | 0 | 14 | 28 | 0 | 14 | 28 | 0 | 14 | 28 |
| A | 1 I | | 354 | 252 | 62 | 530 | 615 | 70 | 14 | 51 | 2 | 53 | 46 | 30 | 91 | 90 | 90 |
| B | 3 I | | 325 | 223 | 88 | 493 | 537 | 160 | 14 | 40 | 5 | 53 | 40 | 40 | 90 | 90 | 90 |
| C | 5 I | | 302 | 198 | 71 | 505 | 475 | 70 | 19 | 42 | 2 | 66 | 55 | 32 | 94 | 92 | 91 |
| D | 2 II | | 325 | 186 | 71 | 440 | 518 | 73 | 13 | 57 | 2 | 35 | 33 | 20 | 90 | 89 | 85 |
| E | 2 III | | 294 | 194 | 18 | 550 | 525 | 12 | 37 | 63 | 0 | 38 | 38 | | 93 | 95 | 94 |
| F | | 0.5 IV | 368 | 214 | | 505 | 418 | | 19 | 24 | | 44 | 39 | | 94 | 93 | |
| G | | 1.5 IV | 332 | 271 | 40 | 415 | 440 | 30 | 11 | 17 | 0 | 36 | 31 | 17 | 89 | 91 | 88 |
| H | | 1.5 V | 298 | 242 | 120 | 569 | 530 | 245 | 42 | 50 | 11 | 56 | 50 | 46 | 95 | 92 | 92 |
| I | | 3 V | 276 | 226 | 119 | 535 | 535 | 218 | 36 | 52 | 10 | 66 | 54 | 42 | 95 | 92 | 92 |
| K | | 1 VI | 324 | 165 | | 570 | 330 | | 29 | 25 | | 55 | 34 | | 94 | 90 | |
| L | | 5 VI | 329 | 162 | | 578 | 340 | | 39 | 33 | | 52 | 33 | | 94 | 90 | |
| M | 0.7 Ia | | 286 | 182 | 45 | 407 | 395 | 27 | 18 | 17 | 2 | 48 | 45 | 20 | 93 | 93 | 90 |

[1] Quantity by weight and compound.
The numbers 0, 14 and 28 designate the days of ageing at 70° C./95% air humidity.

2. A stabilized polyester of claim 1 wherein the silicon compound contains a group having the formula

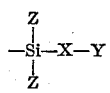

wherein Z is a member selected from the group consisting of an alkyl, aryl and siloxyl.

3. A stabilized polyester of claim 1 wherein the silicon compound contains a group having the formula:

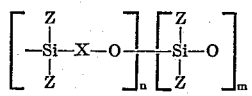

wherein Z is a member selected from the group consisting of alkyl, aryl and siloxyl.

4. The polyester in accordance with claim 1 wherein the organo silicon compound has the following formula:

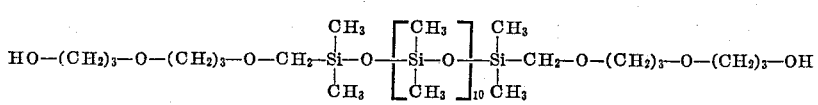

5. The polyester in accordance with claim 1 wherein the organo silicon compound has the following formula:

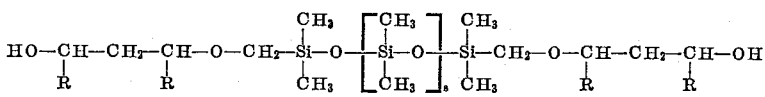

where R is hydrogen and methyl in the ratio of 1:1.

6. The polyester in accordance with claim 1 wherein the organo silicon compound is octamethyl cyclotetrasiloxane.

7. The polyester in accordance with claim 1 wherein the carbodiimide is a polymeric carbodiimide prepared from 1,3,5-triisopropylbenzene-2,4-diisocyanate and has a melting point of 115° C.

8. The polyester in accordance with claim 1 wherein the carbodiimide is 2,2',6,6'-tetraethyl diphenyl carbodiimide.

9. The polyester in accordance with claim 1 wherein the carbodiimide is 2,2',6,6'-tetraisopropyl diphenyl carbodiimide.

10. A stabilized polyester of claim 1 wherein the carbodiimide is a polycarbodiimide having a molecular weight of at least 500 and at least three carbodiimide groups.

11. A stabilized polyester of claim 1 wherein the carbodiimide is an aromatic monocarbodiimide substituted at least in the 2 and 2' positions.

12. A stabilized polyester of claim 1 wherein the carbodiimide is a cycloaliphatic monocarbodiimide substituted at least in the 2 and 2' positions.

13. A polyester stabilized against hydrolysis and aging by having incorporated therein a stabilizing amount of a compound prepared by reacting a carbodiimide containing —NCO groups with a silicon compound of claim 1.

14. A polyurethane prepared by reacting an hydroxyl polyester with an organic polyisocyanate and stabilized against hydrolysis and aging by having incorporated therein a stabilized amount of a carbodiimide and a stabilizing amount of a silicon compound of claim 1.

References Cited by the Examiner

UNITED STATES PATENTS

| | | | |
|---|---|---|---|
| 2,937,164 | 5/1960 | Brown | 260—45.9 |
| 3,050,477 | 8/1962 | Gmitter et al. | 260—45.7 |
| 3,054,759 | 9/1962 | Britain | 260—45.7 |
| 3,193,523 | 7/1965 | Neuman et al. | 260—45.9 |

OTHER REFERENCES

F. W. Waddy, USDA Buent Et 223, 6 pp. 1945.

LEON J. BERCOVITZ, *Primary Examiner.*

JOSEPH R. LIEBERMAN, *Examiner.*

H. E. TAYLOR, *Assistant Examiner.*